Jan. 7, 1947.  D. G. C. LUCK  2,413,981

RADIO DIRECTION FINDING

Filed Feb. 26, 1942

Inventor
David G. C. Luck
By C. D. Tucker
Attorney

Patented Jan. 7, 1947

2,413,981

UNITED STATES PATENT OFFICE 2,413,981

RADIO DIRECTION FINDING

David G. C. Luck, Merchantville, N. J., assignor to Radio Corporation of America, a corporation of Delaware Application February 26, 1942, Serial No. 432,370

7 Claims. (Cl. 250—11)

This invention relates to radio direction finding and has for its principal object the provision of warning means when received signals are unsuitable for direction finding.

It is well known that vertically down-coming waves contain no azimuth information, but may give rise to spurious bearing indications in practical direction finding. With most direction finders, properly sensitive only to vertically polarized waves, purely horizontally polarized waves can give no useful indications but can, by stray pickup, give incorrect bearings. One object of the present invention is to provide means for warning of the presence of unfavorable wave types, so that taking of bearings under error-producing conditions may be avoided.

Any wave, other than a vertically polarized, horizontally incident one may be resolved into vertical and horizontal components of the electric field. The ratio of the vertical electric field component, which is the wave component giving useful bearing information to the horizontal component, is a measure of the overall value of the incoming wave for direction finding.

The present invention may be embodied in a device which compares horizontal and vertical electric field strengths at a predetermined height above the earth's surface and gives warning when the horizontal field exceeds the vertical field by more than a chosen factor.

Figure 1:
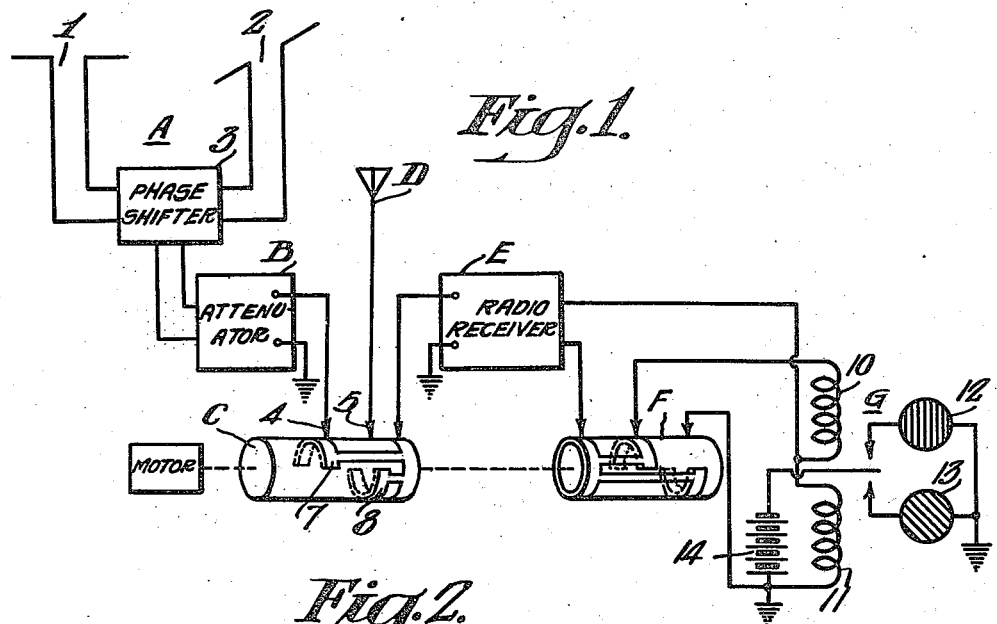
Figure 2:
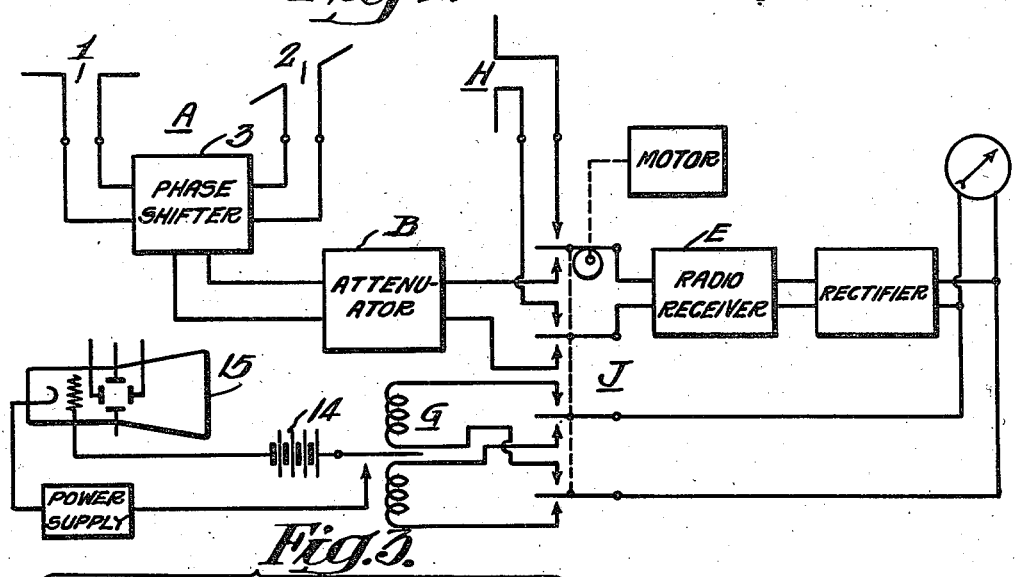
Figure 3:
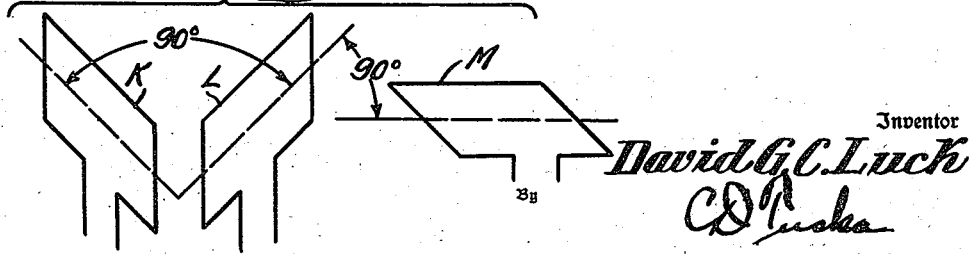

The invention will be described by referring to the accompanying drawing in which Fig. 1 is a schematic diagram of one embodiment of the invention; Fig. 2 is a schematic diagram of a modification of the invention; and Fig. 3 is a diagram of a modification of the antenna system of Figs. 1 and 2.

Referring to Fig. 1, a single-layer turnstile antenna A, of the type shown in U. S. Patent No. 2,086,976, issued July 13, 1937, on an application Ser. No. 41,349 filed on September 20, 1935, by George H. Brown, for an Antenna system, is connected through an attenuator B to a contact 4, riding on a semicircular segment 7 of a motor-driven commutator C. A vertical wire antenna D is connected to a contact 5, riding on a semicircular segment 8 of commutator C. As the commutator C is rotated, it alternately connects antenna A and antenna D to the input of a radio receiver E. The output of receiver E is applied to a second commutator F which is identical with commutator C and is driven synchronously with it to connect the output of receiver E alternately to the opposed windings 10 and 11 of a differential relay device G. In the arrangement shown in Fig. 1 winding 10 is connected to the output of the receiver when the turnstile antenna A is connected to the input, and winding 11 is connected at the same time as the vertical antenna D. Red and green signal lamps 12 and 13 or other suitable indicating devices are connected through opposing contacts of relay G and are energized from a source 14 in accordance with the operation of the relay.

The adjustment and operation are as follows: The receiver E is tuned to the frequency of the signal intended to be used for taking a bearing. The attenuator B is adjusted to the maximum ratio between horizontal and vertical fields which will give reliable bearings. This ratio is determined by the discrimination of the direction finder against unwanted wave types, and depends upon the particular direction finder to be used. Since the effective antenna height will vary with frequency for fixed horizontal antennas this atenuator should be ganged with the tuning control to hold a constant warning ratio.

The horizontal antenna A, which in Fig. 1 is shown as comprising two horizontal dipoles 1 and 2, arranged at right angles to each other and connected through a phase shifter 3, responds to a non-directive horizontal electric field. The signal received from the horizontal antenna, after suitable attenuation, is a measure of the vertical field which must be present in order to give satisfactory bearings. The vertical antenna D responds to a non-directional vertical electric field. The signals from antennas A and D are alternately conducted through the commutator C to the receiver, detected, amplified, and conducted through the commutator F to corresponding the windings 10 and 11, respectively, of the relay G. When the attenuated signal from the horizontal antenna A exceeds the signal from the vertical antenna D, the first winding 10 is energized more than the second winding 11 and the relay G operates to connect the indicator device 12 and to give warning that the signal ratio or directional signal being received is unsuitable for the purpose of direction finding. Similarly, the indicator 13 is operated when the signal ratio is suitable for obtaining satisfactory bearings.

The operation of the modified circuit shown in Fig. 2 is similar to Fig. 1, from which it differs somewhat in the means by which said operation is obtained. In the form of the invention illustrated in Fig. 2, a vertical dipole H is used for the non-directional vertical field pickup. A vibratory switch J is used instead of the rotary switches C and F shown in Fig. 1.

Figure 3 illustrates an arrangement of loop antennas which may be substituted for the antennas shown in Figs. 1 and 2. The loops K and L are disposed, preferably in de-coupled relation, in vertical planes at right angles to one another, and correspond to dipoles 1 and 2 of Fig. 1, while the loop M is placed in a horizontal plane. These loops may replace the rod antennas used in the modifications of Figs. 1 and 2, for use with direction finders responsive to vertical magnetic fields rather than vertical electric fields.

The operation of the loop arrangement is similar to that of Figs. 1 and 2 with the exception that the loops K and L and the loop M respond respectively to the vertical and horizontal magnetic components of a radiation field, instead of the vertical and horizontal electric components respectively. This follows from the fact that a loop antenna responds to the magnetic components of a wave in exactly the same manner as a dipole, extending perpendicular to the plane of the loop and through its center, would respond to the electric components of a similar wave with its electric and magnetic components interchanged.

No particular indicating device is described, since it is obvious that the warning signal may be given in any preferred manner. For example, indicator 12 may be a red light which flashes when the received waves are likely to cause erroneous determinations of bearing; or in direction finders using a cathode ray indicator, the beam may be cut off when the bearing would be likely to be incorrect, if indicated.

Thus the invention has been described as a device for warning of the reception of signals unsuitable for direction finding. This is effected by comparing the horizontal field strength with the vertical field strength, and actuating a signal when the former exceeds the latter by more than a predetermined amount. Such amount or ratio is applied automatically by means of an attenuator which is connected in the network responsive to the horizontal field and is adjusted, preferably automatically, as the system is tuned to different frequencies.

I claim as my invention:

1. A device for indicating the existence of a ratio of the horizontal electric component to the vertical electric component greater than a predetermined value in a radiation field, including two antennas each having substantially uniform horizontal directivity, one of which is predominantly responsive to horizontal electric fields and the other of which is predominantly responsive to vertical electric fields, differential means effectively connected to said antennas and oppositely responsive to signals therefrom, an attenuator connected between one of said antennas and said differential means, indicating means connected to said differential means, and circuit controlling means operated by said differential means to actuate said indicator.

2. A device for indicating the existence of a ratio of the horizontal electric component to vertical electric component in a radiation field, greater than predetermined value, including two antennas, of similar horizontal directivity, one of which is predominantly responsive to horizontal electric fields and the other of which is predominantly responsive to vertical electric fields, differential means effectively connected to said antennas in such manner as to cause the outputs of said antennas to oppose each other, an attenuator connected between one of said antennas and said differential means, indicating means connected to said differential means, and circuit controlling means operated by said differential means to actuate said indicating means.

3. A warning device for radio direction finders, including an antenna responsive to the horizontal electric component of a radiation field, an antenna responsive to the vertical electric component of the same radiation field, a differential relay, a periodic switch arranged to connect said antennas alternately to the input terminals of a radio receiver, a second periodic switch synchronous with the first switch and arranged to connect the output terminals of the radio receiver alternately to the opposing windings of said differential relay, and indicators energized through said relay in accordance with the relative responses of the two antennas.

4. A warning device for radio direction finders, including means responsive to waves arriving from any direction for obtaining voltages proportional to the horizontal and vertical field components of like type of an electromagnetic wave, means for attenuating one of said voltages by a predetermined factor and means for comparing said attenuated voltage with said other voltage.

5. A warning device for radio direction finders, including means responsive to waves arriving from any direction for obtaining voltages proportional respectively to the horizontal and vertical field components of like type of an electromagnetic wave, means for attenuating one of said voltages by a predetermined factor and means for comparing said attenuated voltage with said other voltage.

6. In a warning device for radio direction finders, including means responsive to waves arriving from any direction for deriving voltages proportional respectively to the horizontal and vertical magnetic components of a radiation field, means for attenuating one of said voltages by a predetermined factor and means for comparing said attenuated voltage with said other voltage.

7. A warning device for radio direction finders, including means responsive to waves arriving from any direction for deriving voltages proportional respectively to the horizontal and vertical electrical components of a radiation field, means for attenuating one of said voltages by a predetermined factor and means for comparing said attenuated voltage with said other voltage.

DAVID G. C. LUCK.